Feb. 11, 1958     K. A. WEMPE ET AL     2,823,130
BISCUIT PACKAGE AND LINER
Filed Jan. 25, 1955     2 Sheets-Sheet 1
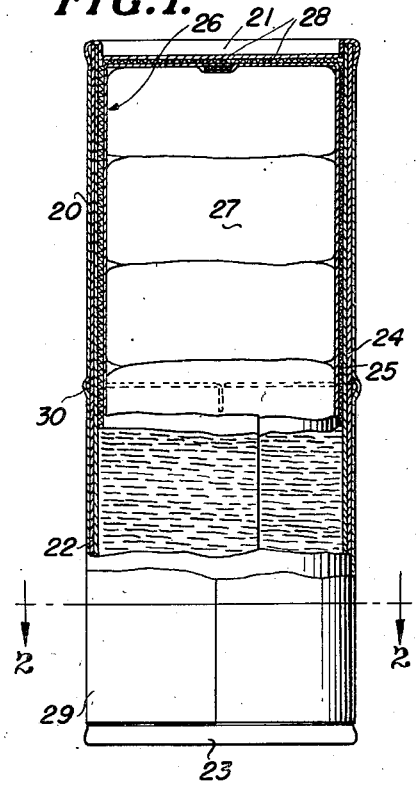
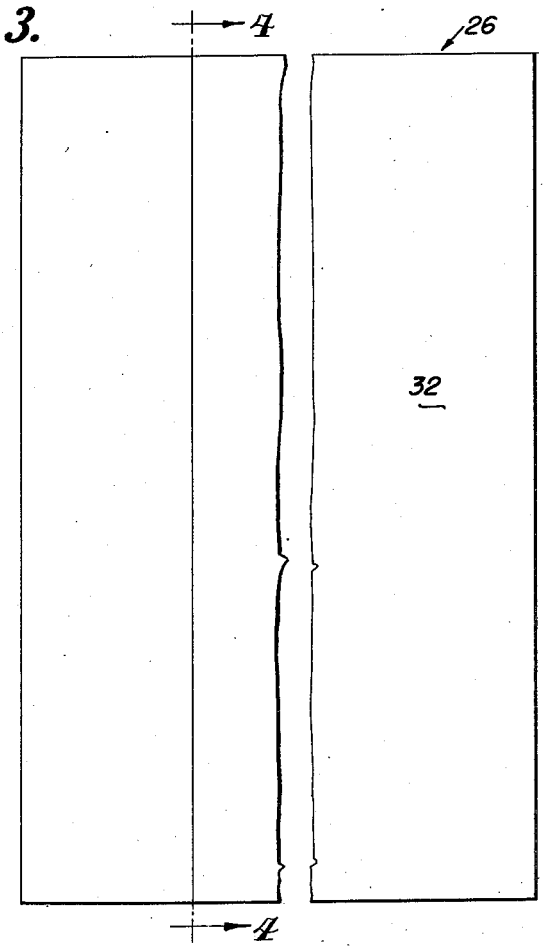
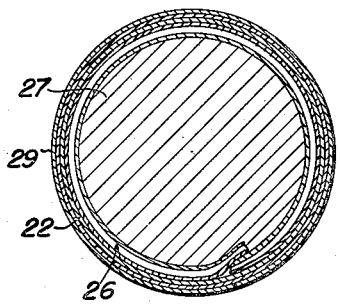
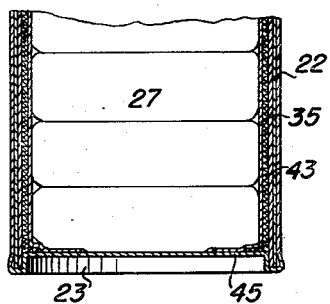
INVENTORS
KENNETH A. WEMPE
ROTEN E. SMITH
BY Cushman, Darby & Cushman
ATTORNEYS Feb. 11, 1958     K. A. WEMPE ET AL     2,823,130
BISCUIT PACKAGE AND LINER
Filed Jan. 25, 1955     2 Sheets-Sheet 2
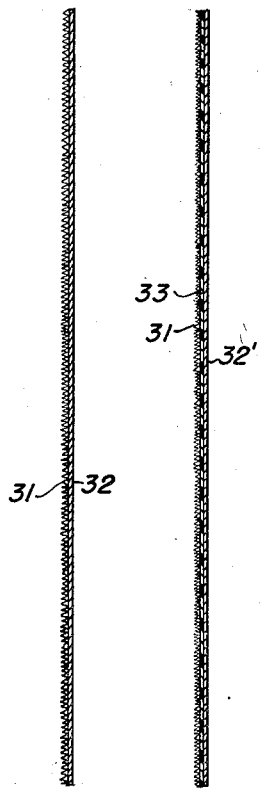
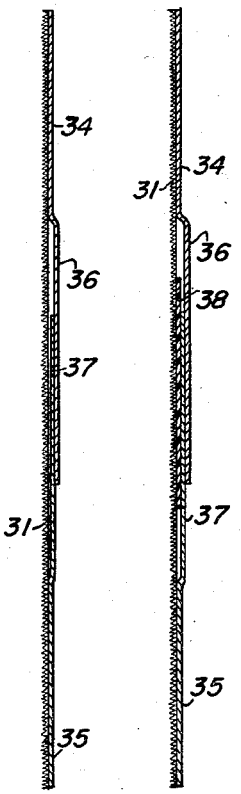
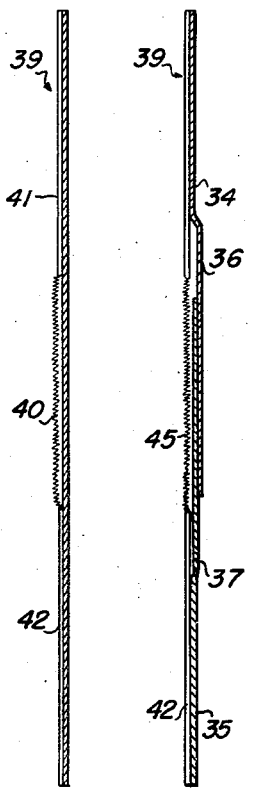
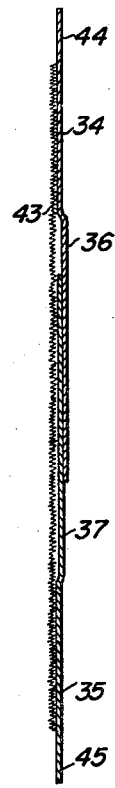
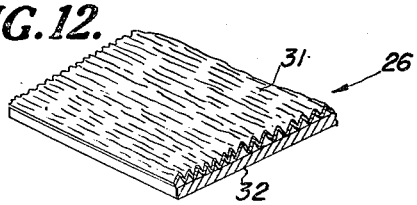
INVENTORS
KENNETH A. WEMPE
ROTEN E. SMITH
BY
*Cushman, Darby & Cushman*
ATTORNEYS

United States Patent Office 2,823,130
Patented Feb. 11, 1958

2,823,130

BISCUIT PACKAGE AND LINER

Kenneth A. Wempe and Roten E. Smith, Dallas, Tex., assignors to Gladiola Biscuit Company, Dallas, Tex., a corporation of Texas Application January 25, 1955, Serial No. 483,974

16 Claims. (Cl. 99—172)

This invention relates to food packages and liners, and in particular to biscuit dough packages and extensible liners therefor.

Pre-leavened biscuit dough is commonly packaged and sold in containers, which are maintained under refrigeration to keep the dough inactive. When the package is removed, for purchase or use, from its cool environment and permitted to warm up, leavening action in the dough resumes, resulting in the build up of internal pressure in the container, to a point which under extreme conditions may become dangerous. It is obviously necessary in packaging such material to utilize containers of sufficient strength to withstand moderate internal pressure, and designed to open in such manner that the internal pressure will be relieved gradually rather than suddenly. A sudden release of support, it will be understood, may force dough out of the container in an unformed mass, quite distinct from the individual biscuit form originally packed, and if the internal pressure is permitted to build up excessively before the package is opened, sudden separation of the container into sections may result in forceful propulsion of one or both sections.

Remarkable improvement and advantages have been achieved by the use of cylindrical or tubular containers comprising telescoping sections, which when opened permit the sections to separate axially a limited distance before the dough body contained therein is released from lateral support. Containers of this type are illustrated and described, for example, in United States Patent No. 2,638,820, issued May 19, 1953, to T. F. Barnes, and the present invention is particularly useful in combination with containers of this type.

Even with tubular, telescoping containers, excessive internal pressure built up before the container is opened may force dough laterally outwardly between the container sections when first separated, to deform the dough biscuits. To counteract this possibility, we have found it advantageous to enclose the biscuit dough body within the container with a novel extensible liner, capable of axial extension while withstanding moderate internal pressure. It is a principal object of the present invention, accordingly, to provide high strength, extensible liners for use in combination with sectional, telescoping biscuit dough containers.

Another object of the invention is to provide a novel food package liner comprising an extensible creped outer layer of high strength material and a smooth layer of inert material, adhered to the high points on the inner side thereof.

Still another object is to provide a food package liner comprising an extensible outer layer, and a smooth inner layer comprised of two overlapping sheets of aluminum foil, adapted to slip relative to each other as the outer layer extends.

A further object is to provide biscuit dough packages including liners folded into novel end sealing relationship with the outer containers.

Other objects of the invention are to provide biscuit package liners advantageous from the viewpoints of safety and preservation of the edible contents, and adapted to facilitate packing of the dough biscuits, removal of the dough biscuit body from the outer container, and easy separation of the dough biscuits from the liners after the packages have been opened. Further objects will be in part obvious and in part pointed out hereinafter.

The invention and the novel features thereof may best be made clear from the following description and the accompanying drawings, in which:

Figure 1 is an elevational view, partly in section, of an exemplary complete and sealed biscuit dough package constructed and lined in accordance with the present invention;

Figure 2 is a sectional view taken on the line 2—2 of Figure 1;

Figure 3 is an elevational view of the liner of Figure 1 in flat form looking toward the inert material side thereof;

Figure 4 is a sectional view taken on the line 4—4 of Figure 3;

Figure 5 is a sectional view similar to Figure 4, showing a modified liner;

Figure 6 is a sectional view of another modification of the liner, including two overlapping inert material sheets;

Figure 7 is a sectional view of the liner of Figure 6, provided however with a strip of plastic material underlying the overlapping sections of the inert material sheets;

Figure 8 is a sectional view of yet another modification of the liner, including a paper backing layer creped only in the central section thereof;

Figure 9 is a sectional view of a liner similar to that of Figure 8, but employing two overlapping inert material sheets;

Figure 10 is a sectional view of a liner similar to that of Figure 6, wherein the creped paper backing is shortened relative to the inert material sheets;

Figure 11 is a sectional view of a filled and closed container, illustrating the end seal relationship which may be effected with the liner of Figure 10, and Figure 12 is a perspective view of a corner of the liner of Figures 3 and 4.

Referring to the drawings in detail, Figures 1 and 2 illustrate a filled and closed biscuit dough package, including an outer container comprising a tubular upper section 20, constructed of cardboard or the like and closed by a metal cap 21 crimped thereonto. The container is completed by a similar lower section 22, closed at its bottom by the metal cap 23. From the upper section 20 an outer skirt 24 extends downwardly in axial direction, to telescope and enclose an inner skirt 25 extending in opposite direction from the lower container section 22. Inside the container is disposed the liner indicated generally as 26, which encloses a plurality of preformed, pre-leavened dough biscuits 27. As illustrated in Figures 1 and 3, the liner 26 may be longer than the closed container, whereby its ends 28 may be folded into overlapping relationship to completely separate the dough biscuits from the container caps, as shown. The closed container may be covered with an outer label 29, and a tear string 30 may be provided under the label, preferably at the juncture between outer skirt 24 and the lower section 22.

The simplest embodiment of the liner of the present invention is illustrated in Figures 3, 4 and 12, and comprises an outer creped backing layer 31 and an inner smooth sheet layer 32 of material inert to the biscuit dough. The backing 31 may be high strength paper, preferably parchment paper, and is creped in common manner to be extensible in one direction to a considerable extent, for example 50% or 100%. The parchment paper stock may vary in weight from about 10 pounds to about 50 pounds, 24 pound weight being quite suitable.

The preferred material for sheet 32 is aluminum foil, a thickness of .00035" being entirely suitable although lighter or heavier gage foil may be employed. The inert material sheet 32 is applied to an already creped backing, as by contacting the creped paper with a roll covered with edible glue or other suitable adhesive, and then pressing the sheet 32 lightly against the glued side of the paper. The foil or other inert material sheet is thereby adhered to the high points on one side of the creped paper sheet, without pressing out or disturbing the creping of the paper. The applied foil sheet remains substantially smooth and flat, any resulting distortion thereof being minor and incidental.

As will be apparent, the sheet 32 may comprise other material inert to biscuit dough. Synthetic plastic materials such as polyvinylidene chloride, for example, may be utilized, this term being intended to include both polymers and copolymers of vinylidene chloride. The polyvinylidene chloride may be applied in sheet form, as described, or may be sprayed onto the creped backing. Other materials suitable for use, including regenerated cellulose and polyethylene, will be evident to those skilled in the art.

The package may be made up by completely assembling the outer container except for the upper metal cap 21, rolling the liner into cylindrical form with the inert material sheet 32 innermost, folding the lower liner end 28 inwardly to close it, and then inserting the liner, closed end first, into the container. The liner is rolled, of course, about an axis disposed transverse to the creping of the liner backing, so that the liner will be extensible in axial direction. The prepared biscuits may then be inserted into the open upper end of the liner, the liner upper end 28 folded over the biscuits, and the metal cap 21 crimped on to close the package. When packed, it will be understood, the biscuits fit easily into the lined container. Thereafter leavening action causes the biscuits to expand and substantially completely fill the container. In the embodiment of Figure 1, the biscuits 27 are completely enclosed by and contact only the inert material layer 32, whereby they are effectively protected and preserved.

To open the container, the outer label 29 may be severed by pulling the string 30, and the container sections then separated by relative twisting. Ordinarily the container sections will be only weakly connected to each other or engaged by light gluing, or they may be joined only by the label. If the biscuit dough is relatively cool and inactive when the package is opened, moderate internal pressure will cause the container sections to move apart slowly and slightly, but the overlapping skirts 24 and 25 will effectively maintain lateral confining pressure on the biscuit body and maintain its shape. The liner and biscuits may then be removed from the container sections and the liner unwrapped, exposing the biscuits ready for use. The smooth inert material layer 32 separates easily and cleanly from the biscuits.

In the axial expansion of the biscuit dough body within the container, the liner is held firmly against the metal caps 21 and 23, but by reason of its creping may extend along its length to retain its enveloping relationship to the expanding dough body. In the extension of the liner backing 31, the inert sheet 32 may extend with it, if of extensible nature as in the case of polyvinylidene chloride, or may split and break, as in the case of aluminum foil. Splitting of the inert inner sheet 32 when the package is opened is not unduly detrimental, as the inert sheet has by then already served its primary purpose of preserving the biscuit dough body and separating it from the creped paper.

Any momentary contact between the biscuit dough and the creped backing, as may occur when the package is opened, is normally not sufficient to imbed the biscuits in the corrugations of the backing to such extent as to make separation difficult.

If the package has warmed sufficiently before opening for leavening action to resume and internal pressure to build up, the liner 26 performs an added function, in that it serves to maintain lateral confining pressure on the dough body after the container sections have separated to the extent that their skirts 24 and 25 no longer overlap. The backing 31 being of strong stock resistant to rupture, and extensible only in axial direction, it is capable of resisting the internal pressure after the container sections have separated far enough to clear their skirts, and serves thereafter as a containing envelope for the dough during its further expansion. The liner is effective, in other words, to confine expansion of the dough to the axial direction, whereby the biscuit form of the dough is preserved. When the dough body has initially expanded, the container sections may be removed and the liner unrolled, as previously described.

A variation of the liner of Figures 3 and 4 is illustrated in Figure 5, wherein an intermediate layer 33 of plastic material is interposed between a creped paper backing 31 and an aluminum foil sheet 32'. The layer 33 is composed of organic plastic material, such as polyvinylidene chloride or wax. In the latter case, the wax may serve also to adhere the foil sheet 32 to the backing. The primary purpose of the intermediate layer 33 is to provide an inpenetrable layer between the foil sheet 32' and the backing, which will facilitate relative slippage of the foil sheet and prevent contact of the dough body with the backing if and when the foil sheet splits.

Another embodiment of the invention is illustrated in Figure 6, wherein two inert material sheets 34 and 35 are adhered to the backing 31. As illustrated, one inert material sheet 34 may be adhered to the high points of an edge section of the paper backing, in the manner previously described, leaving a free section 36 which extends over the central portion of the backing. The other inert sheet 35 may be similarly adhered to the opposite edge section of the paper sheet, leaving a free section 37 which extends over the central portion of the backing in overlapping relationship to the section 36. This configuration may be employed in the manner previously described, but is advantageous in that the extension of the paper backing is confined primarily to the central portion thereof. In this extension the free overlapping sections 36 and 37 may slip relatively to each other, thereby preserving separation between the biscuit dough body and the paper backing.

The configuration of Figure 6 is particularly advantageous when the liner sheets 34 and 35 are aluminum foil. In a preferred form of the invention, the foil sheet 35 whose free section 37 underlies the corresponding free section is adhered to the backing with bright side facing outwardly, and the foil sheet 34 whose free section 36 overlies the free section 37 is adhered to the backing with bright side facing inwardly toward the backing. In this manner, the overlying foil sections 36 and 37 are arranged with bright sides contiguous, whereby they may slip relatively to each other with maximum efficiency.

The embodiment of Figure 6 may be modified by the addition of a slip strip 38 of plastic material or the like, adhered to the central portion of the paper backing beneath the overlapping sections 36 and 37, as illustrated in Figure 7, to facilitate slipping of the foil sections. The strip 38 may be composed of wax, polyvinylidene, regenerated cellulose or the like.

Another embodiment of the liner of the invention is illustrated in Figure 8, wherein the paper backing 39 comprises a central portion 40 extending across the width of the backing creped in a single direction to extend as previously described, the creped portion being adjoined by smooth uncreped portions 41 and 42. To the centrally creped backing may be applied the inert material sheet 32. As will be evident, the creped portion 40, which may be from about 2" to about 4" in width, is positioned centrally of the liner and of suitable extent to provide the necessary extension. The backing of the Figure 8 embodiment may if desired be provided with overlapping material sheets 34 and 35, as described in connection with Figures 6 and 7, this embodiment being illustrated in Figure 9. The sections 40, 41 and 42 may be integral, or the backing 39 may be built up by adhesively uniting three separate sections. The smooth uncreped liner portions 41 and 42 greatly facilitate removal of the filled liner body from the separated container sections when the package is opened.

In the normal case, the extended length of the liner exceeds the axial length of the container sufficiently to permit the top and bottom portions of the liner to be folded over in such manner as to completely separate the ends of the biscuit dough body from the container ends, as illustrated in Figure 1. This permits the limited volume of air remaining in the corrugations of the liner backing to reach the ends of the biscuit dough body. While usually not detrimental, in some cases this may result in minor discoloration of the end biscuits. To insure against this possibility, the liner may be constructed as illustrated in Figure 10, with a creped backing layer 43 corresponding in length to the container length. To the backing 43 may be adhered the inert material inner sheet 32, or as illustrated, inert material sheets 34 and 35 comprising free overlapping sections 36 and 37. In this case, the inert material sheet or sheets adhered to the backing are provided with free outwardly extending sections 44 and 45, whereby the inert material sheet layer is of greater extent than the backing.

When the package is made up, the backing 43 is folded over in contact with the metal caps 21 and 23 only very slightly or not at all, and the extending sections 44 and 45 of the inert material layer extend therebeyond to partially separate the ends of the biscuit dough body from the metal caps. The internal pressure of the biscuit dough body is in such case adequate to force the inert material sections 44 and 45 into close sealing contact with the container end caps, effective to preclude any air in the corrugations of the creped backing 43 from access to the biscuit dough body. The assembled relationship is illustrated in Figure 11.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

We claim:

1. A food package liner comprising a sheet of creped paper, a first smooth sheet of inert material adhered only to an edge section of said paper sheet extending parallel to the creped foldings therein, said inert material sheet extending over the central portion of said paper sheet, and a second smooth sheet of inert material adhered only to the opposite edge section of said paper sheet and extending over the central portion thereof in overlapping relationship to said first inert material sheet.

2. A liner as defined in claim 1, including a layer of plastic material adhered to the central portion of said paper sheet and underlying the overlapping portions of said inert material sheets.

3. A liner as defined in claim 1, wherein the central portion of said paper sheet is waxed on the side to which said inert material sheets are adhered.

4. A liner as defined in claim 1, wherein said paper sheet is waxed on the side to which said inert material sheets are adhered.

5. A biscuit package liner comprising a sheet of creped parchment paper, a first sheet of aluminum foil adhered only to the high points of an edge section of said paper sheet extending parallel to the creped foldings therein, said inert material sheet extending over the central portion of said paper sheet, and a second sheet of aluminum foil adhered only to the high points of the opposite edge section of said paper sheet and extending over the central portion thereof in overlapping relationship to said first foil sheet, the underlying foil sheet being disposed with its bright side facing outwardly from said paper sheet and the overlying foil sheet being disposed with its bright side facing toward said paper sheet, whereby the overlapping foil portions are arranged with bright sides contiguous.

6. A liner as defined in claim 5, wherein each of said foil sheets extends outwardly beyond the paper sheet edge section to which it is adhered.

7. A biscuit package comprising a tubular container body composed of two telescoping sections, and a liner in said container, said liner comprising an outer sheet of paper creped transversely of the container axis and a smooth sheet of inert material adhered to the projections on the inside of said paper sheet.

8. A biscuit package comprising a tubular container body composed of two telescoping sections, and a liner in said container filled with and enclosing the biscuit dough, said liner comprising an outer sheet of parchment paper creped transversely of the container axis and a sheet of aluminum foil adhered to the high spots on the inside of said paper sheet.

9. A biscuit package comprising a tubular container body composed of two telescoping sections, and a liner in said container filled with and enclosing the biscuit dough, said liner comprising an outer sheet of parchment paper creped transversely of the container axis, a first sheet of aluminum foil adhered only to an end section of the inside of said paper sheet extending parallel to the creped foldings therein, said inert material sheet extending over the central portion of said paper sheet, and a second sheet of aluminum foil adhered only to the opposite end section of the inside of said paper sheet and extending over the central portion thereof in overlapping relationship to said first foil sheet.

10. A package as defined in claim 9, wherein the length of said liner exceeds the length of the closed container and the end sections of said liner are folded completely over the ends of the biscuit dough body.

11. A package as defined in claim 9, wherein the length of said paper sheet corresponds substantially to the length of the closed container, and each of said foil sheets extends beyond the paper sheet end to which it is secured, the extending ends of said foil sheets being folded over the ends of the biscuit dough body in sealing contact with the container ends.

12. A biscuit package comprising a tubular container body composed of two telescoping sections, and a liner in said container filled with and enclosing the biscuit dough, said liner comprising an outer sheet of parchment paper creped transversely of the container axis, a first sheet of aluminum foil adhered only to the high points on the inside of an edge section of said paper sheet extending parallel to the creped foldings therein, said inert material sheet extending over the central portion of said paper sheet, and a second sheet of aluminum foil adhered only to the high points on the inside of the opposite edge section of said paper sheet and extending over the central portion thereof in overlapping relationship to said first foil sheet, the underlying foil sheet being disposed with its bright side facing outwardly from said paper sheet and the overlying foil sheet being disposed with its bright side facing toward said paper sheet, whereby the overlapping foil portions are arranged with bright sides contiguous.

13. A biscuit package as defined in claim 7, wherein said inert material is plastic material, and including a sheet of aluminum foil adhered to the inside of said plastic material sheet.

14. A biscuit package as defined in claim 7, wherein said inert material sheet extends beyond the ends of said creped paper sheet.

15. A biscuit package as defined in claim 7, wherein the end sections of said paper sheet are uncreped.

16. A biscuit package as defined in claim 9, wherein the end sections of said paper sheet are uncreped.

References Cited in the file of this patent

UNITED STATES PATENTS

| | | |
|---|---|---|
| 2,020,928 | Asnes | Nov. 12, 1935 |
| 2,139,138 | Spafford | Dec. 6, 1938 |
| 2,202,870 | Rowe | June 4, 1940 |
| 2,681,284 | Graves | June 15, 1954 |

OTHER REFERENCES

"Refrigerating Engineering," February 1954, page 46, article entitled "Packaging and Wrapping Materials."